3,226,437
N,N'-BISOLELYLOXAMIDE
Harry D. Anspon, Kansas City, Mo., and Roger P. Cahoy, Merriam, Kans., assignors, by mesne assignments, to Gulf Oil Corporation, Pittsburgh, Pa., a corporation of Pennsylvania
No Drawing. Filed Sept. 5, 1961, Ser. No. 135,773
1 Claim. (Cl. 260—561)

This invention relates to novel polyolefin compositions having improved block and slip properties, and related processes. More particularly, relates to polyethylene compositions having these desired properties.

Polyethylene objects, for example, films, tubes, and other objects, have a tendency to adhere strongly to each other when in contact, as in a roll of film or in a stack of bags of untreated polyethylene. This adherence, referred to in the art as "blocking," is obviously inconvenient and troublesome, particularly when polyethylene bags, films, and the like are fed one by one from a stack into automatic packing and filling mechanisms. Moreover, the tendency to block by polyethylene is magnified by applied pressures and by elevated temperatures.

Various solutions have been proposed to lessen or eliminate blocking in polyethylene objects. Various inorganic substances such as silicas have been incorporated in polyethylene compositions to mitigate the undesired blocking effect. Although the resulting polyethylene compositions have shown at times some reduction of blocking, the inorganic substances undesirably act as abrasives during admixing with polyethylene resulting in grinding away small flecks of metal from the standard mixing apparatuses employed, such as Banbury mixers. The final product then often has an unwanted grayish or metallic sheen.

Additionally, it is desired in many articles fabricated of polyethylene to have good "slip" properties. By good "slip" is meant the property of polyethylene objects to slip or to slide one over the surface of another with a minimum of pulling force, such as is experienced in pulling a slightly weighted sheet of polyethylene film over a second stationary sheet of the same film in the direction of contact.

An object of this invention is to provide novel polyolefin compositions having improved properties. A further object of this invention is to provide polyethylene compositions having desired low blocking and high slip properties. Another object of this invention is to provide processes of diminishing blocking and increasing slip in polyethylene. Other objects of this invention will be apparent from the disclosure herein set out.

By this invention is provided polyethylene compositions having desired low blocking and high slip properties which comprise in admixture normally solid polyethylene and from about 0.005 percent to about 1.0 percent by weight of N,N$^1$-bisolelyloxamide, based on the weight of polyethylene. A preferred concentration of N,N$^1$-bisolelyloxamide in the above compositions is about 0.03 percent to about 0.3 percent on the same basis.

The compositions of this invention can be provided by adding an amount of N,N$^1$-bisolelyloxamide in accordance with the above ranges to a normally solid polyethylene employed in the manufacture of films, bags, molded articles, and other consumer items. The N,N$^1$-bisolelyloxamide and polyethylene combination is thoroughly mixed by using apparatuses customarily employed in forming homogenous blends of polyethylene compositions containing additives, such as Banbury mixers, compounding extruders, roll mills, and the like. Conditions employed in such mixing, such as temperature, length of mixing periods, pressures, and the like, are those within the skill of the polymer art.

The N,N$^1$-bisolelyloxamide compound employed in the compositions of this invention can be provided by the reaction of two moles of olelylamine with one mole amount of an oxalyl halide, e.g., oxalyl chloride, in an inert reaction medium such as benzene. Another method of providing N,N$^1$-bisolelyloxamide is by the reaction of two moles of oleylamine with one mole amount of a lower alkyl di-ester of oxalic acid, e.g., diethyl oxalate. The N,N$^1$-bisolelyloxamide product is removed from the reaction mixtures following conventional isolation procedures and is recrystallized and is dried, as desired. The N,N$^1$-bisolelyloxamide is a white solid showing a melting point of 84–5° (uncorr.).

It will be suggested to those skilled in the art to which this invention is directed that certain variations can be made in the oleyl portion of the oxamide compound and yet retain its desired anti-blocking and enhanced slip properties; and such resulting variant polyethylene compositions are included within the scope of this invention. For example, at least one of the groups can be replaced with an erucyl group.

Films, tubes, plates, and the like are provided from the above compositions by employing devices and processes customarily employed in the preparation of such articles from polyethylene. Illustratively speaking, film can be provided from the compositions by using film extruders, blown film machines, and the like.

In evaluation of the blocking characteristics of the polyethylene compositions in this invention, film is provided by standard procedures and is evaluated following a plate method carried out as follows: About five-inch squares of a collapsed tube of blown film are carefully severed from a roll without stretching or otherwise distorting and leaving the block of the internal surfaces of the tube intact. The film section is treated by superfically applying a thirty pound weight on the film to exert an evenly distributed force. The weight is left in place for twenty-four hours at 30° C. A blocked square is centered between two four-inch square metal plates leaving about a one-half inch margin protruding from each edge of the plates. The test is run at 30° C. and at approximately 100% humidity. The plates are affixed, in a horizontal plane, to the upper and lower jaws of a testing machine so that the plates are in direct alignment and with the films carefully taped to the respective bottom and top plates. The blocking measure is the load in grams required to separate the film sections, the lower the value, the better the block property of the sample.

The slip evaluations are determined by the following standard procedure: The apparatus employed is a moving platform—stationary sled type—in which the sled and the platform are in leveled horizontal planes and the sled is superimposed on the platform. The sled consists of a rectangular metal block having surface dimensions of two and one-half inches by four inches, the sled being weighted to 325 grams. To the platform having dimensions of approximately eight inches by twenty-four inches is affixed by taping a section of blown film with the inside tube surface exposed, with the axis of the machine direction of the film coinciding with the longitudinal axis of the sled. The film is conditioned for at least sixteen hours under the standard laboratory conditions prior to conducting the test. A section of film is attached to the sled in like manner finally leaving the respective inside surfaces of the film sections in gravity contact when in testing position. The platform is moved in the horizontal plane in the machine direction of the films to provide a slipping action of the film of the stationary sled over the film of the moving platform, at a rate of about thirty inches per minute. The average pull in grams, or slip value, is automatically recorded. Again, the lower the gram value obtained, the better the slip of the sample.

The blends of this invention also exhibit good values with respect to other important properties, in comparison with the base polyethylene. Such other properties include haze, gloss, clarity, and color, as determined by standard comparative tests.

Other additives employed in polyethylene compositions can also be incorporated in the compositions of this invention. For example, anti-oxidants, fillers, pigments, stabilizers, lubricants, and the like can be incorporated in desired quantities following usual procedures. Preferably, the additional additives are added in lesser quantities than those which substantially interfere with the desired characteristics of the compositions of this invention.

As above stated, the polyethylene compositions of this invention are particularly useful for the manufacture of films, sheets, tubing, and the like. However, the compositions can also be used in certain molding applications, such as in the manufacture of injected molded objects, in certain coating applications, and the like where low blocking and good slip properties are desired.

The following illustrative examples are given by way of further description of this invention, but not in limitation thereof.

*Example 1*

A quantity of 12.7 g. (0.1 mole) of oxalyl chloride and 200 ml. of dry benzene is added to a 300 ml., four-necked, round bottom flask equipped with a ground stirrer, a calcium chloride protected reflux condenser, a dropping funnel, and a thermometer. To the benzene mixture is added dropwise 16 ml. of pyridine with stirring over a thirty minute period. The addition of the pyridine causes an exothermic reaction and a precipitation of a yellow solid. The dropping funnel is then charged with 66.9 g. (0.25 mole) of oleylamine, which is added dropwise to the stirred mixture. The addition of oleylamine also brings about an exothermic reaction and necessitates cooling the reaction mixture so as to maintain the reaction temperature at about 45–50° C. On the addition of the oleylamine, an intense color change is brought about in the reaction mixture and the amount of the solid precipitate present in the reaction mixture is greatly diminished. On completion of the addition of the oleylamine, the reaction mixture is refluxed for an additional two hours, after which it is filtered at about 65° C. The removed precipitate is discarded. To the benzene filtrate containing the produced N,N¹-bisolelyloxamide, hexane is added with stirring to initiate precipitation of a white solid consisting of N,N¹-bisolelyloxamide. The desired product is removed by filtration in a yield of 59 g.

The N,N¹-bisolelyloxamide product is recrystallized once from acetone. The recrystallized product is washed by slurrying in warm methanol. The methanol mixture is cooled and the product is removed by filtration and is dried. The dried N,N¹-bisolelyloxamide obtained in a yield of about 40 g. is a white solid melting at 84–5° C. (uncorr.). Infrared analysis shows absorption peaks at 3.0, 6.0, and 6.5 microns indicating the product to be the desired N,N¹-bisolelyloxamide. Elemental analysis: Calculated for $C_{38}H_{72}N_2O_2$, C, 77.48%; H, 12.32%; N, 4.76. Found, C, 77.28%; H, 12.48%; N, 4.86.

*Example 2*

A film grade polyethylene having a density of about 0.9211 and a melt index of about 1.14 is employed to prepare the polyethylene composition described below. Solid N,N¹-bisolelyloxamide is added in the amount of one part per 1000 parts of the film grade polyethylene at flux, and the combination is thoroughly admixed to form a uniform blend with a Banbury mixer during which the melt is maintained at about 240° F. for about three minutes. The resulting uniform polyethylene composition is formed into film by using a standard blown film machine, the resulting film having a thickness of about one mil. A control film is also provided using the same polyethylene base.

The tests as described hereinabove performed on the films show the results of the following table.

TABLE I

| Composition | Degree of Slip (Grams) | Degree of Blocking (Grams) |
|---|---|---|
| Polyethylene (control) | 400+ | 67 |
| Blend of Polyethylene and 0.1% N,N¹-bisolelyloxamide | 48 | 4.6 |

The data of the table show that the polyethylene containing 0.1 percent N,N¹-bisolelyloxamide has excellent slip and block properties since both the slip and blocking values obtained in the standard tests are very low.

What is claimed is:
N,N¹-bisolelyloxamide.

References Cited by the Examiner
UNITED STATES PATENTS

| | | | |
|---|---|---|---|
| 2,461,509 | 2/1949 | Harvey et al. | 260—561 |
| 2,594,286 | 4/1952 | Bryant | 260—561 |
| 2,965,676 | 12/1960 | Fierce et al. | 260—561 |
| 2,977,309 | 3/1961 | Godfrey et al. | 260—561 |
| 2,991,265 | 7/1961 | Clark et al. | 260—32.6 |
| 3,021,296 | 2/1962 | Ammondson | 260—32.6 |
| 3,022,345 | 2/1962 | Szmuszkovicz | 260—561 |
| 3,023,242 | 2/1962 | Bornemann et al. | 260—561 |

OTHER REFERENCES

Rice et al., Jour. Amer. Chem. Soc., vol. 75, pages 242–3 (1953).

WALTER A. MODANCE, *Primary Examiner.*

L. J. BERCOVITZ, *Examiner.*